Jan. 24, 1956

S. P. LOWE 2,731,888

MACHINE FOR MILLING BRAKE SHOE LININGS

Filed Oct. 3, 1951

INVENTOR.
Sydney P. Lowe
BY
Warren H. F. Schmieding
his attorney

Jan. 24, 1956  S. P. LOWE  2,731,888
MACHINE FOR MILLING BRAKE SHOE LININGS
Filed Oct. 3, 1951  3 Sheets-Sheet 2

INVENTOR.
Sydney P. Lowe
BY
Werner H. F. Schmieding
his Attorney

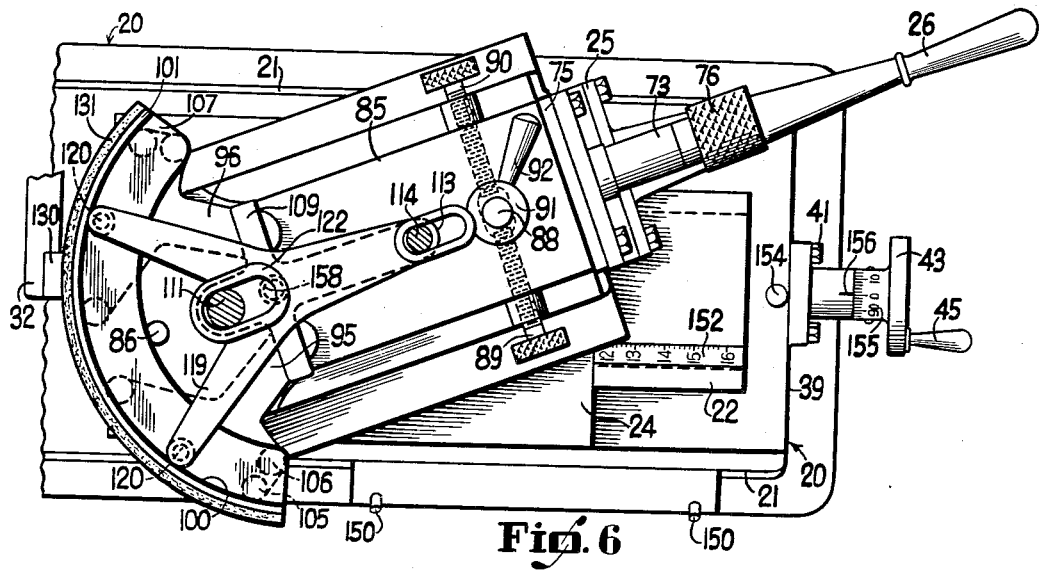

United States Patent Office 2,731,888
Patented Jan. 24, 1956

2,731,888

MACHINE FOR MILLING BRAKE SHOE LININGS

Sydney P. Lowe, Columbus, Ohio, assignor to Bigelow, Inc., Columbus, Ohio, a corporation of Ohio Application October 3, 1951, Serial No. 249,561

6 Claims. (Cl. 90—20)

The present invention is a continuation-in-part of my co-pending application Serial Number 95,304, filed May 25, 1949.

The present invention relates to a machine for milling brake shoe linings, such as that employed in automobiles. The machine is used for milling off old linings from brake shoes, and for finishing and truing the new linings on the brake shoes. A rotating cutting element is used to perform the milling. The brake shoe with the lining thereon is clamped into a turntable with the lining facing the milling element. Then by turning the turntable and progressively moving the turntable, and the shoe carried thereon, toward the milling element, a milling action is imparted to the lining.

A new brake shoe has a peripheral lining brake surface in the form of a segment of a true circle. However, through usage the brake shoe is often bent or warped to such degree that if the brake shoe, with the lining thereon, is oscillated about a fixed pivot, in the milling operation of removing the old brake lining, a part of the brake shoe proper will be brought into cutting relationship with the milling element before all of the lining is removed from another part of the brake shoe. The present invention contemplates using the brake shoe as a follower or cam for maintaining milling relationship between the milling element and the lining as the arcuate peripheral surface is progressively brought in contact with the milling element.

If the brake shoe is not warped too much, it can be re-used with a new lining thereon. The present machine is also used for milling the peripheral surface of the lining to a true sector of a perfect circle although the brake shoe is warped.

Further objects and advantages of the present invention will be apparent from the following description, reference being had to the accompanying drawings wherein a preferred form of embodiment of the invention is clearly shown.

In the drawings:

Fig. 6 is a top plan view of the turntable mechanism employed, showing a brake shoe in position;

Fig. 7 is a fragmentary view of a brake shoe and part of the clamping mechanism therefor;

Fig. 8 is a view similar to Fig. 7 but showing the clamping mechanism applied in a different manner; and Fig. 9 is a top plan view of part of the turntable showing a brake shoe clamped into position and also showing the roller mechanism which causes the turntable to move to and fro in following the contour of a warped brake lining.

Figure 1:
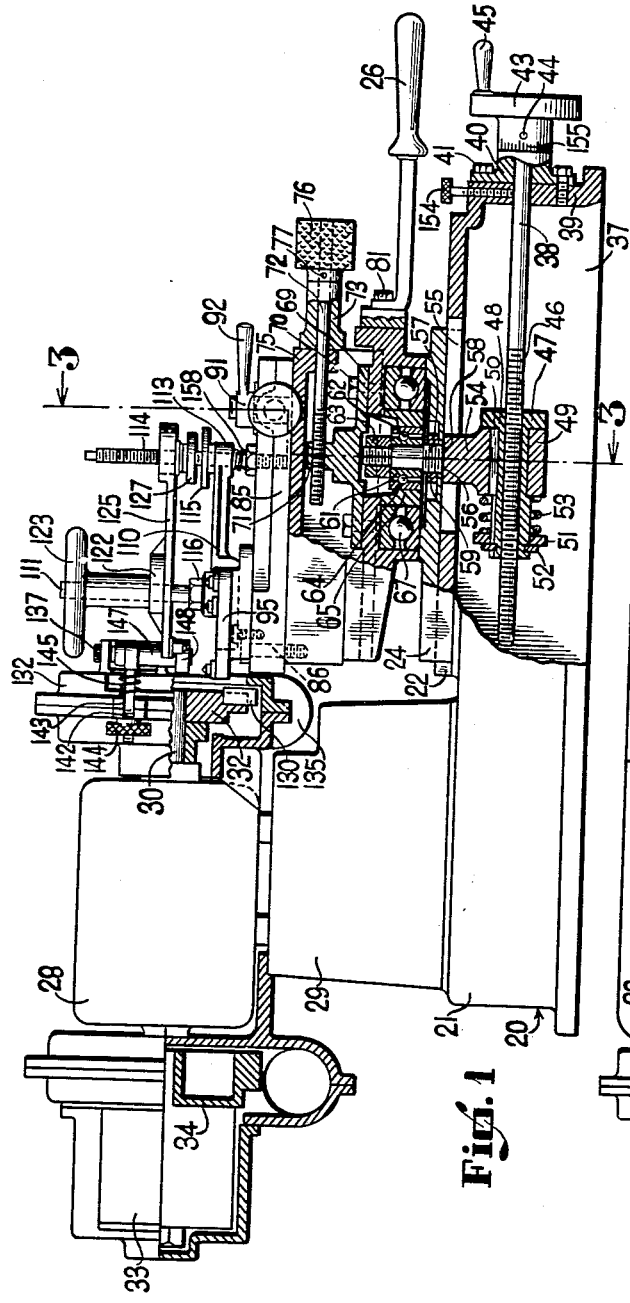
Fig. 1 is a side view of the improved machine, parts thereof being shown in section, the section being taken substantially along line 1—1 of Fig. 2.
Figure 2:
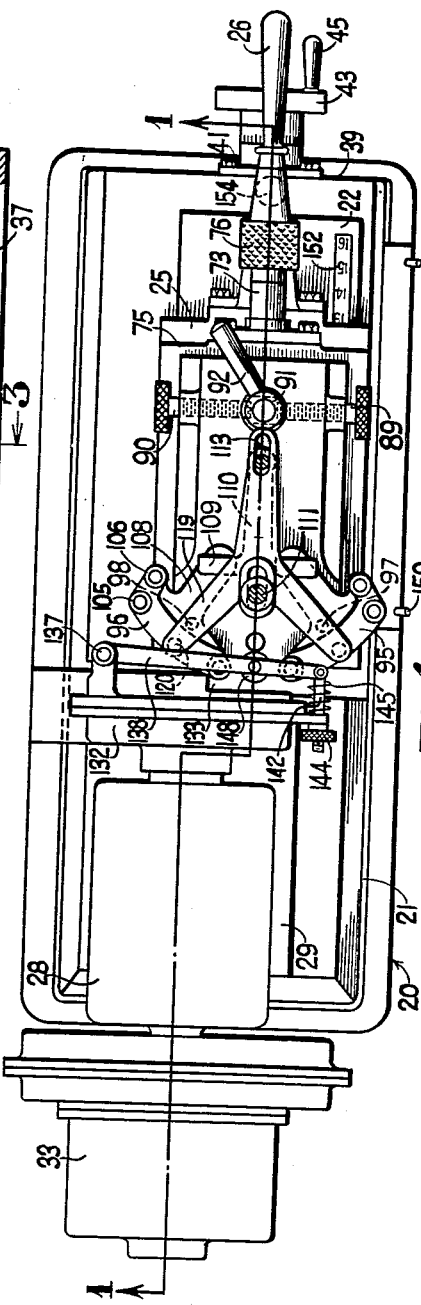
Fig. 2 is a top plan view of the machine.

Referring generally to the drawings, the machine 20 includes a rearwardly extending base 21 having a rearwardly extending dovetail 22 on the upper surface thereof. This dovetail 22 provides a rearwardly extending guide for a turntable base 24. Turntable base 24 carries a turntable 25 which is manipulated by a handle 26. A brake shoe with the lining thereon is clamped onto the top of the turntable by a suitable mechanism, to be described, so that the brake shoe can be oscillated by the movement of the handle 26 of the turntable.

An electric motor 28 is carried on a base 29 which latter is carried upon the base 21. The shaft 30 of the motor extends longitudinally of the base, that is rearwardly, and drives a milling element 32. This element 32 also functions as a suction fan. If desirable the extreme end of the shaft may be used to drive an abrading wheel 33 and actuate a suction fan 34. By feeding the turntable toward the abrading wheel and by operating the turntable, the peripheral surface of the arcuate brake shoe lining is milled by the milling element 32.

Figures 3, 4:
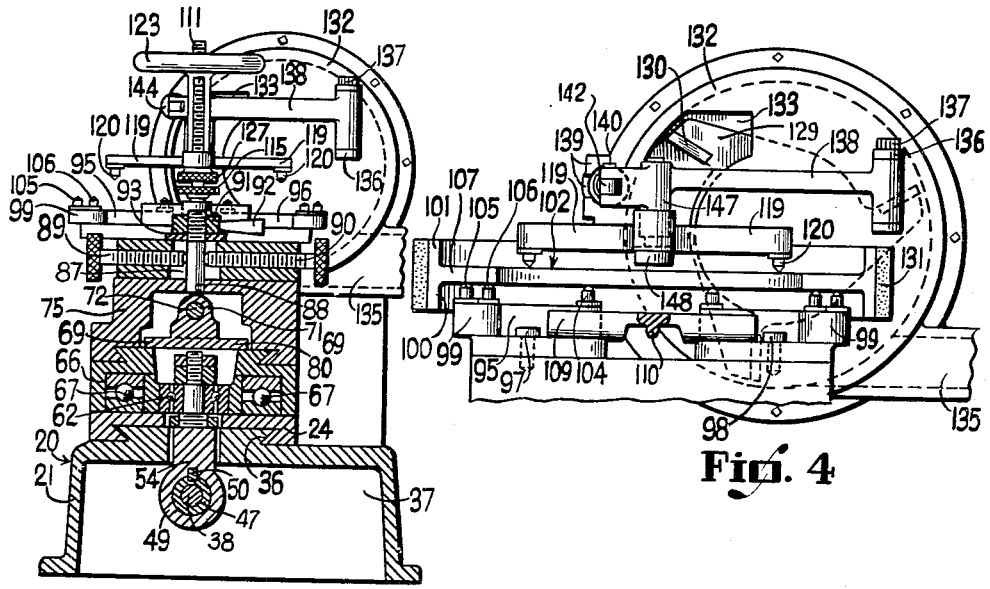
Fig. 3 is a sectional view taken on line 3—3 of Fig. 1.
Fig. 4 is a front view of the machine for clamping the brake shoe in position and showing a brake shoe.

Referring more in detail to the drawings, and particularly Figs. 1 and 3, it will be seen that the turntable base 24 is provided with a rearwardly extending dovetail groove 36 which receives the dovetail 22 on the top side of the main base 21. Thus the base 21 provides a guide for the forward and rearward movement of the turntable base 24. The base 21 is hollow as shown at 37. A rotating screw 38 extends through the front wall 39 of base 21 and is arranged parallel with the dovetail 22. The screw 38 is journaled in a bearing block 40 which is secured to the front 39 of the base 21 by screws 41. The forward end of the screw 38 is secured to a wheel 43 by a pin 44 and the wheel is rotated by a handle 45. Screw 38 is threaded as shown at 46 and is threaded into an elongated nut 47 having a flange or shoulder 48. Nut 47 is longitudinally slidably mounted in a sleeve 49 and is prevented from rotating by any suitable means such as by the key 50. As seen in Fig. 1, the nut 47 extends to the left of sleeve 49 and carries a washer 51 held in place by a key 52. A coil spring 53 surrounds the nut 47 and is interposed between the washer 51 and the left side of sleeve 49 and normally urges the sleeve against the shoulder 48 on the nut 47. Sleeve 49 is formed integrally with an upwardly extending arm 54 and this arm extends into a rearwardly extending slot 55 in the top surface of the base 21. This arm 54 terminates substantially flush with the top surface 56 of the base 21. A stud 57 of somewhat smaller diameter than the diameter of the arm 54 projects upwardly from the arm 54 to provide a shoulder 58. The stud 57 extends upwardly through an opening in the turntable base 24 and the base 24 is fastened to the top side of arm 54 by a nut 59 threaded onto the stud 57.

An inner race 61 of a ball bearing 62 is clamped against an upwardly facing circular shoulder on the stud 57 by lock nuts 63. The outer race 64 of the ball bearing 62 is suitably secured in the hub 65 of the turntable 25. A circular recess 66 is formed in the bottom part of the turntable 25 which receives a thrust bearing 67, arranged concentrically of the radial ball bearing 62.

By turning the handle 45 clockwise, the nut 47 and turntable will be moved forwardly on the screw 38 and when turned counterclockwise the nut and turntable will move rearwardly.

A plate 69 is secured by screws 70 to the top side of turntable 25 and this plate includes an upwardly extending and centrally disposed lug 71, the upper portion of which is drilled and threaded rearwardly to receive screw 72. Screw 72 is journaled in a bearing block 73, which latter is secured to a longitudinally shiftable block 75 of the turntable. The shaft 72 can be turned by a knob 76 which is fastened to the screw 72 by a pin 77.

Turntable 25 is provided with upwardly projecting dovetail 79 which is received by a dovetailed slot 80 in the block 75. By turning the knob 76, the block 75 can be moved forwardly or rearwardly with respect to the turntable base 25. The handle 26 is secured to the turntable base 25 by screws 81.

Thus it will be seen that by manipulating the screws 38, through the handle 45, the position of the turntable can be adjusted with respect to the base. The entire turntable can be oscillated about the stud 57, and as viewed in Fig. 1, the block 75 can be adjusted longitudinally with respect to the turntable 25 by manipulating the screw 73 through the knob 76.

A brake shoe supporting plate 85 is carried on the top side of block 75. Plate 85 is pivotally carried for horizontal movement on the block 75 by a stud 86. Stud 86 is disposed near the rear of the plate 85. The forward part of the plate 85 has an opening 87 which receives a stud 88, which latter is fastened to the top side and extended upwardly from the block 75. This opening 87 is considerably larger than the stud so that the plate 85 can be swung about the pivot stud 86. The position of the plate 85 with respect to the block 75 can be adjusted by adjusting screws 89 and 90, which latter extend horizontally from opposite sides of the plate 85, into the opening 87 and into abutting relationship with the stud 88. Referring to Fig. 9, when the screws 89 and 90 are shifted upwardly, the plate will be swung in a counterclockwise direction and when the screws are moved downwardly, the plate 85 will be moved in a clockwise direction. A nut 91 having a handle 92, is threaded on the stud 88. A washer 93 is interposed between the top of plate 85 and nut 91 and spans the opening 87. After the adjustment is made by screws 89 and 90, the nut is pulled down to clamp the plate 85 to block 75.

A pair of brake shoe locating arms 95 and 96 are carried on the top surface of the plate 85, said arms are spaced from one another and each is pivotally mounted for horizontal swinging movement on studs 97 and 98 respectively. Each of these arms is provided with a rear arcuately shaped abutment 99 for engaging the lower portion 100 of the arcuately shaped flange 101 of a brake shoe 102. Each of these arms 95 and 96 is provided with upwardly extending abutments 104, 105 and 106, which are arranged to engage the horizontally extending web 107 of the brake shoe 102, as shown in Fig. 7, to thus provide three-point support for the web, or are arranged to engage the lower portion 100 of the brake shoe as shown in Fig. 8. When the lower portion 100 of a brake shoe is pressed against the arms 95 and 96, the arms will turn about their pivots 97 and 98. While the brake shoe is held pressed against the arms 95 and 96, these arms are then clamped to the plate 85. For this purpose each of the arms is provided with a forwardly projecting tail piece 108 and these tail pieces are spanned by the cross arms 109 of a T-shaped clamping element 110. Clamping element 110 is loosely pivoted on a stud 111 which is fastened to and extends upwardly from the plate 85. The hole in the clamp element 110, for receiving the stud 111 extends through the head of the T-shape element, i. e. lies rearwardly of the cross arms 109. The foot or tail portion 113 of the clamping element 110 is slidably mounted on a stud 114. This stud is threaded for receiving a nut 115. The top of the head of clamping element 110 abuts a shoulder in the form of a nut 116 on the stud 111. Therefore, when the nut 115 is turned to force the tail piece 113 downwardly, the cross arms 109 will bear against the tail pieces 108 of arms 95 and 96 and thereby clamps said arms in position. The studs 111 and 114 form guides for the clamping element 110.

The brake shoe, resting upon the abutments 104, 105 and 106, is then clamped in position by a second clamping element 118. Clamping element 118 includes two fingers 119 which extends substantially radially rearwardly from the stud 111. These fingers 119 are provided with downwardly extending projections 120 which are arranged to engage the top side of the brake shoe web 107, as shown in Fig. 7, or these fingers are arranged to engage the top portion 101 of the brake shoe, as shown in Fig. 8. The clamping element 118 is provided with a rearwardly extending slot 122 through which the stud 111 extends. This stud is threaded for receiving a wheel-nut 123, the lower portion of which is arranged to engage the top side of the clamping element 118 and force said element downwardly. The tail piece 125 of the clamping element 118 is also provided with a rearwardly extending slot which spans the stud 114. A second nut 127 is threaded on stud 114, above nut 115, and forms a rest or stop for tailpiece 125. When the wheel-nut 123 is screwed downwardly, it will force the clamping element fingers 119 downwardly to clamp the brake shoe against the projections 104, 105 and 106 of the arms 95 and 96.

As will be seen from Figs. 1 and 4 and particularly Fig. 4, the rotatable milling element 32 includes a plurality of radially extending blades 129 each carrying a knife 130. The cutting edges of the knives extend forwardly into milling relation with the brake lining 131 on the shoe 102. The milling element 32 is contained within a housing 132 which is suitably carried by the motor base 29. The front of the housing is provided with an opening 133 into which the rear most portion of the brake shoe extends so as to be contacted by the knives 130 to effect the milling operation. The housing 132 is provided with an outlet or exhaust 135. The milling element is so designed and shaped so as to not only function as a milling machine but also as a fan for drawing the fines milled off the shoe and eject the fines through the outlet 135. This outlet may be connected with an outlet tube (not shown).

The front of the housing 132 is provided with spaced lugs 136 disposed somewhat above the center and to the right of the center. These lugs are drilled to receive a vertically extending pivot pin 137 which carries a horizontally extending arm 138. The left or free end of the arm 138 is bifurcated as shown at 139 and carries a vertically extending pin 140 for pivotally supporting a rearwardly extending arm 142. This arm is arranged to be swung into a notch 143 in the housing 132. The outer end of arm 142 is threaded to receive a nut 144. A coil spring 145 surrounds the arm 142 and is interposed between the housing 132 and the arm 138 and normally urges the arm 138 outwardly. A lug 147 depends from the arm 138 intermediate the ends thereof and this lug carries a roller 148, which is rotatable about a vertical axis. Roller 148 can be arranged to engage the upper inner peripheral surface of the brake shoe 102.

Figure 5:
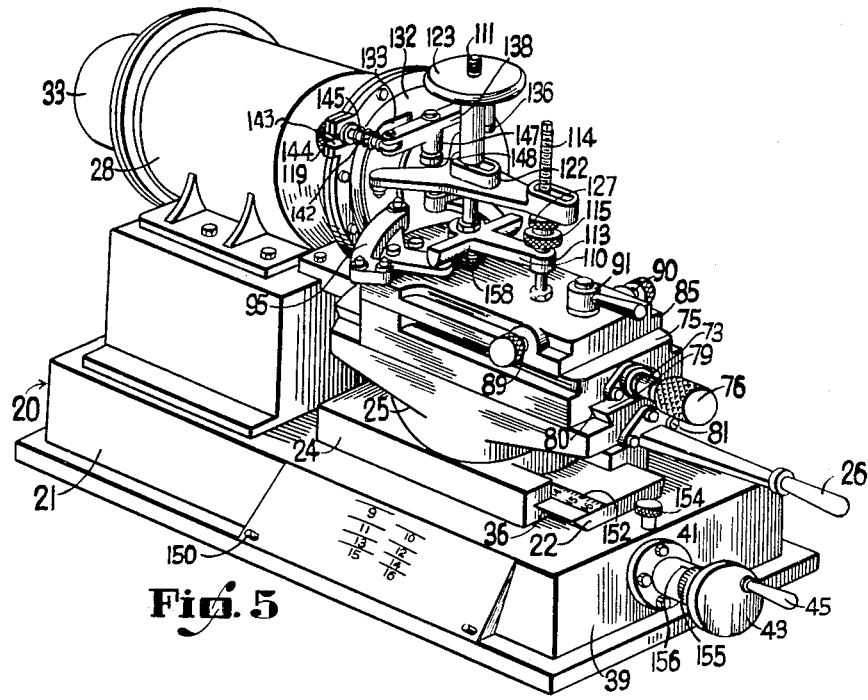
Fig. 5 is a perspective view of the machine.

Referring to Fig. 5, it will be seen that the left side of the base 21 is provided with outwardly extending pins 150 and arcuately shaped indicia. Each of these indicia lines has an inch reference numeral. Brake drums are manufactured in various sizes, varying from nine inches to sixteen inches internal diameter. Obviously the arc of the brake lining must correspond with that of the brake drum. By placing the outer peripheral surface of the brake drum, with the worn lining thereon, against the bottom side of pin 150 and then viewing where the upper peripheral surface of the lining registers with the numbered indicia, the mechanic can readily determine the radius of the arc of the brake shoe. A scale 152 is also imbedded on the top side of dovetail 22.

Let us assume that it is desirable to re-line a set of brake shoes for a fourteen inch brake drum. The operator will clamp a brake shoe in position on a turntable as previously described. He will then turn the handle 45 for turning screw 38 so that the front end of the turntable 24 registers with the indicia 14 on a scale 152. He will then move the handle counterclockwise to move the turntable 24 rearwardly approximately .150 inch. The screw 38 is then locked in position by set screw 154. At this time the spring 53 is pressing the sleeve 49 against the shoulder 48 on the nut 47. At this time the arm 142 is free of the notch 143 and the roller 148 lies forwardly of the brake shoe. The arm 142 is then swung into the notch 143 and then the nut 144 is turned to draw the brake shoe rearwardly until the outer peripheral surface of the lining is brought flush with the forwardly extending portion of a knife 130. The turning of the screw 144 will draw the entire turntable rearwardly against the opposition of coil spring 53, i. e. the sleeve 49 will slide rearwardly longitudinally of the nut 47 and rearwardly of the shoulder 48.

The motor 28 is then started and a slow oscillating movement is imparted to the turntable by the handle 26. After one or two movements of the handle 26, the knurled nut 76 is turned to move the block 75 rearwardly, to further extend the brake shoe lining into cutting relation with the knives 130. At this time, the arm 138 carrying the roller 148 is held stationary by the reaction of spring 53. The inner peripheral surface of the brake shoe will function as a cam as it is rolled over the roller 148, and if the brake shoe is warped, a to and fro (forward and backward) movement will be imparted to the turntable as it is being oscillated. This milling operation continues until substantially all of the old lining is removed. The nut 144 is then turned to release the tension on the arm 142. The arm 142 is swung out of the notch 143 and the arm 138 is permitted to move forwardly. The brake shoe is then removed after loosening the nut 123 of the clamping mechanism. It is desirable to remove all of the old lining from the shoe and for this purpose, the operator will use the rotating abrasive wheel 33 for that purpose.

After the new lining is applied to the brake shoe, it is necessary to finish the outer peripheral surface of the lining to conform to the arc of a true circle. The relined brake is clamped in position as previously described. At this time the roller 148 is rendered ineffective, that is, moved forwardly of the inner peripheral surface of the brake shoe, either by loosening the nut 144 sufficiently for this purpose or by swinging the arm 142 out of the notch 143. After loosening set screw 154, the screw 38 is then turned to pull the turntable base and turntable forwardly so that the front edge of the turntable base 24 registers with the numeral 14. If it is desirable to finish the brake shoe slightly oversize, as is often done, the screw is then again turned so as to bring the turntable base and turntable forwardly a distance equal to the desired oversize thickness of the brake lining. This distance can be gaged by the vernier indicia 155 on the wheel and the scratch 156 on the bearing blocks 40. It will be understood that at this time the screw 72 is turned by the wheel 76 so that the brake lining clears the knives 130. After the setting of the screw 38 by the set screw 154, the operator will swing the turntable, by the handle 26, so that, for example, the left end of the brake shoe is adjacent a knife. The screw 72 is then operated to move the block 75 rearwardly so as to bring that end of the shoe adjacent a knife. The operator then swings the turntable so that the right end of the brake shoe is brought adjacent the knife. If there is, for example, a greater clearance between the right end of the brake shoe lining and the knife than between the left end of the brake shoe and the knife, the operator will swing the plate 85 about its pivot 86 so that the clearances are substantially the same. He accomplishes this by first loosening the nut 91. He will then loosen nut 89 by moving the same to the left, as viewed in Fig. 3, and then moving nut 90 to the right. The operator then starts the motor and causes a light milling operation to be imparted to the peripheral surface of the brake shoe lining, at the same time observing whether the cut on the right end is substantially equal to the cut on the left end of the lining. It may be necessary to slightly readjust the position of the plate by manipulating the screws 89 and 90. After he is satisfied that the same amount of milling operation is being made at both ends of the brake shoe, he will tighten the nut 91 to lock the plate 85 more securely to the block 75. The milling operation is continued by the oscillation of the turntable and by gradually moving the block 75 rearwardly by the screws 72. This operation is continued until the entire surface of the lining has been at least partly milled. Thus by the present mechanism, the peripheral surface of the lining can be milled to an arc of a true circle although the brake shoe has been warped due to straining in braking operation.

It will be observed that the stud 86 for the pivotal swinging of plate 88 is placed as close to the periphery of the shoe as possible so that maximum adjustment of the peripheral surface of the shoe is obtained by a minimum movement of the screws 89 and 90.

The arc of the peripheral surface of the locating arms 95 and 96 has a radius slightly less than the radius of the arc of the inner peripheral surface of the smaller brake shoe so that, regardless of the size of the brake shoe, the brake shoe will be contacted by a portion of the peripheral surface of the arms 95 and 96 substantially midway between the ends of said surfaces. In this manner, regardless of the size of the brake shoe, its position on the turntable will be substantially the same.

In some types of brake shoe mechanism, the brake shoe is supported by the web 107 of the braking mechanism, and in another style, the brake shoe is supported by the rim. For best results in the milling finishing operation, it is desirable to support the brake shoe in the same manner as it is to support it on the braking mechanism. Therefore, the brake shoe, which is suspended by the web 107 in the braking mechanism is finished by clamping the same as shown in Fig. 7. And in that style of shoe, in which the brake shoe is supported by the rim, the clamping mechanism is applied to the rim of the shoe. For this purpose, the holes 122 and blank of the second clamping mechanism 118 are elongated rearwardly. Such elongated holes are also necessary in view of the fact that the second clamping element 118 extends rearwardly a different distance when clamping a smaller diameter shoe in position than when clamping a larger diameter shoe in position. If desirable a lifting spring 158 may be employed underneath the clamping element 110 so that when the nut 115 is loosened, the clamping element 110 will be lifted off of the tail pieces 108 of the arms 95 and 96. Such spring is shown as a coil spring on the stud 114.

Thus it will be seen that by the present machine, a single turntable may be employed for oscillating the brake shoe to remove all of the old lining from a warped shoe, and also the new linings, applied to the brake shoe, can be finished to the arc of the true circle.

While the form of embodiment of the present invention as herein disclosed constitutes a preferred form, it is to be understood that other forms might be adopted, all coming within the scope of the claims which follows:

I claim:

1. A brake shoe machine for milling a brake shoe lining, comprising in combination, a base having a guideway; a rotatable cutting mechanism for milling the peripheral surface of a brake lining and carried by the base; a brake shoe supporting mechanism, one of said mechanisms having a guideway cooperating with and guided by the guideway of the base and movable relative to the base, a threaded shaft rotatably carried by the base, a nut threaded on the shaft for longitudinal movement along said shaft when said shaft is rotated, a shoulder on the nut disposed transversely of the axis of said shaft, said one mechanism having a complementing shoulder movable longitudinally of the axis of said shaft, a spring normally yieldingly urging the shoulder of said one mechanism against the shoulder of the nut, said brake shoe supporting mechanism including a turntable and means pivotally supporting the turntable on the supporting mechanism for oscillation on an axis disposed transversely of the axis of said shaft, said turntable having means for supporting a curved brake shoe having a brake lining thereon with the axis of the brake shoe curve disposed transversely of the axis of said shaft and with the lining in position to be milled on the peripheral surface thereof when the turntable is oscillated, and a guide on said base engageable by the inner surface of brake shoe when the brake shoe is supported by the brake shoe support means for causing longitudinal movement of said one mechanism, relative to said guide, against the tension of said spring upon oscillation of the turntable, and a handle for oscillating said turntable.

2. A brake shoe machine for milling a brake shoe lining, comprising in combination, a base having a guideway; a rotatable cutting mechanism for milling the peripheral surface of a brake lining and carried by the base; a brake shoe supporting mechanism, said latter mechanism having a guideway cooperating with and guided by the guideway of the base and movable relative to the base, a threaded shaft rotatably carried by the base, a nut threaded on the shaft for longitudinal movement along said shaft when said shaft is rotated, a shoulder on the nut disposed transversely of the axis of said shaft, said brake shoe supporting mechanism having a complementing shoulder movable longitudinally of the axis of said shaft, a spring normally yieldingly urging the shoulder of said brake shoe supporting mechanism against the shoulder on the nut, said brake shoe supporting mechanism including a turntable and means pivotally supporting the turntable on the supporting mechanism for oscillation on an axis disposed transversely of the axis of said shaft, said turntable having means for supporting a curved brake shoe having a brake lining thereon with the axis of the brake shoe curve disposed transversely of the axis of said shaft and with the lining in position to be milled on the peripheral surface thereof when the turntable is oscillated, and a guide on said base engageable by the inner surface of the brake shoe when the brake shoe is supported by the brake shoe support means for causing longitudinal movement of said cutting mechanism, relative to said guide, against the tension of said spring upon oscillation of the turntable, and a handle for oscillating said turntable.

3. A brake shoe machine for milling a brake shoe lining, comprising in combination, a base having a guideway; a rotatable cutting mechanism for milling the peripheral surface of a brake lining and carried by the base; a brake shoe supporting mechanism, one of said mechanisms having a guideway cooperating with and guided by the guideway of the base and movable relative to the base, a threaded shaft rotatably carried by the base, a nut threaded on the shaft for longitudinal movement along said shaft when said shaft is rotated, a shoulder on the nut disposed transversely of the axis of said shaft, said one mechanism having a complementing shoulder movable longitudinally of the axis of said shaft, a spring normally yieldingly urging the shoulder of said one mechanism against the shoulder on the nut, said brake supporting mechanism including a turntable and means pivotally supporting the turntable on the supporting mechanism for oscillation on an axis disposed transversely of an axis of the shaft, means for oscillating the turntable, a plate pivotally mounted on the turntable for movement transversely of the axis of said shaft, means for shifting the plate about its axis and for holding same in adjusted position on said turntable, said plate having means for supporting a curved brake shoe having a brake lining thereon with the axis of the brake shoe curve disposed transversely of the axis of said shaft and with the lining in position to be milled on the peripheral surface thereof when the turntable is oscillated, and a guide on said base engageable by the inner surface of the brake shoe when the brake shoe is supported by the brake shoe support means for causing longitudinal movement of said one mechanism, relative to said guide, against the tension of said spring upon oscillation of the turntable, and a handle for oscillating said turntable.

4. A brake shoe machine for milling a brake shoe lining, comprising in combination, a base having a guideway; a rotatable cutting mechanism for milling the peripheral surface of a brake lining and carried by the base; a brake shoe supporting mechanism, one of said mechanisms having a guideway cooperating with and guided by the guideway of the base and movable relative to the base, a threaded shaft rotatably carried by the base, a nut threaded on said shaft for longitudinal movement along said shaft when said shaft is rotated, a shoulder on the nut disposed transversely of the axis of said shaft, said one mechanism having a complementing shoulder movable longitudinally of the axis of said shaft, a spring normally yieldingly urging the shoulder of said one mechanism against the shoulder on the nut, said brake shoe supporting mechanism including a support having a guideway extending parallel with the guideway of the base, a turntable base having a guideway cooperating with and guided by the last mentioned guideway, means for shifting the turntable base along the guideway of the support, a turntable and means pivotally supporting the turntable on the supporting mechanism for oscillation of the turntable base on an axis disposed transversely of the axis of said shaft, said turntable having means for supporting a curved brake shoe having a brake lining thereon with the axis of the brake shoe disposed transversely of the axis of said shaft and with the lining in position to be milled on the peripheral surface thereof when the turntable is oscillated, and a guide on said base engageable by the inner surface of the brake shoe when the brake shoe is supported by the brake shoe support means for causing longitudinal movement of said one mechanism, relative to said guide, against the tension of said spring upon oscillation of the turntable, and a handle for oscillating said turntable.

5. A brake shoe machine for milling a brake shoe lining, comprising in combination, a base having a guideway; a rotatable cutting mechanism for milling the peripheral surface of a brake lining and carried by the base; a brake shoe supporting mechanism, one of said mechanisms having a guideway cooperating with and guided by the guideway of the base and movable relative to the base, a threaded shaft rotatably carried by the base, a nut threaded on the shaft for longitudinal movement along said shaft when said shaft is rotated, said brake supporting mechanism including a turntable and means for pivotally mounting the turntable on the supporting mechanism for oscillation on an axis disposed transversely of the axis of said shaft, a handle for oscillating the turntable, a plate pivotally mounted on the turntable means for shifting the plate about its pivotal connection and for holding the plate in adjusted position on said turntable, means on the plate for supporting a curved brake shoe thereon with the axis of the brake shoe curve disposed transversely of said shaft, the pivotal point of said plate on the turntable being adjacent the periphery of the brake shoe when the brake shoe is in position on the machine.

6. A brake shoe machine for milling a brake shoe lining, comprising in combination, a base having a guideway; a rotatable cutting mechanism for milling the peripheral surface of a brake lining and carried by the base; a brake shoe supporting mechanism, one of said mechanisms having a guideway cooperating with the guide by the guideway of the base and movable relative to the base, a threaded shaft rotatably carried by the base, a nut threaded on the shaft for longitudinal movement along said shaft when said shaft is rotated, said brake supporting mechanism including a turntable and means pivotally supporting the turntable on the supporting mechanism for oscillation on an axis disposed transversely of the axis of said shaft, a handle for oscillating the turntable, a plate and means for pivotally mounting the plate on the turntable for movement transversely of the axis of said shaft, the pivotal point of said plate on the turntable being adjacent the periphery of the brake shoe when the brake shoe is in position on the machine, means for shifting the plate about its pivotal connection and for holding same in adjusted position including a threaded stud, an adjusting screw carried by the plate and engaging said stud, and a nut on the threaded stud adapted to lock the plate in adjusted position, said plate having means for supporting a curved brake shoe having a lining thereon with the axis of the brake shoe curve disposed transversely of the axis of said shaft and with the lining in position to be milled on the peripheral surface thereof when the turntable is oscillated.

References Cited in the file of this patent

UNITED STATES PATENTS

| Number | Name | Date |
|---|---|---|
| 897,603 | Duncan | Sept. 1, 1908 |
| 1,156,292 | Johnson et al. | Oct. 12, 1915 |
| 1,339,202 | Kochendorfer | May 4, 1920 |
| 1,906,201 | Simpson | Apr. 25, 1933 |
| 1,919,545 | Fisher | July 25, 1933 |
| 1,984,074 | McCabe | Dec. 11, 1934 |
| 2,230,824 | Bigelow | Feb. 4, 1941 |
| 2,289,693 | Blazek | July 14, 1942 |
| 2,304,530 | Bigelow | Dec. 8, 1942 |
| 2,325,826 | Barrett | Aug. 3, 1943 |
| 2,328,650 | Johnson et al. | Sept. 7, 1943 |
| 2,356,571 | Dewoitine | Aug. 22, 1944 |
| 2,367,916 | Young | Jan. 23, 1945 |
| 2,401,078 | Johnson | May 28, 1946 |
| 2,415,520 | Obecny | Feb. 11, 1947 |
| 2,439,234 | Brantly | Apr. 6, 1948 |
| 2,577,534 | Lowe | Dec. 4, 1951 |